United States Patent Office 3,775,381
Patented Nov. 27, 1973

---

3,775,381
PROCESS FOR PREPARING A MODIFIED PETROLEUM RESIN FOR USE IN GRAVURE INK
Hideo Hayashi, Kawasaki, Hisatake Sato, Yokohama, and Yusaku Mizuno, Kawasaki, Japan, assignors to Nippon Oil Company, Limited, Minato-ku, Tokyo, Japan
No Drawing. Filed Dec. 29, 1971, Ser. No. 213,827
Claims priority, application Japan, Dec. 29, 1970, 46/121,058
Int. Cl. C08f 3/48, 3/70, 5/02
U.S. Cl. 260—78.4 D                10 Claims

ABSTRACT OF THE DISCLOSURE

A process for preparing a modified petroleum resin suitable for gravure ink manufacture which comprises by polymerizing a fraction boiling in the temperaurte range of from 140° C. to 220° C. obtained from thermally cracked petroleum distillates in the presence of a Friedel-Crafts type catalyst to produce a resin with a remarkably high softening point, for example, as high as 160° C., adding a predetermined amount of an unsaturated carboxylic acid or its anhydride to the polymerized resin thus obtained, and further esterifying the acid added resin with monohydric alcohols to obtain a resin having a softening point above 145° C.

---

This invention relates to a process for preparing a modified petroleum resin for use in gravure ink.

Heretofore, varnish obtained by dissolving limed rosin or a limed rosin containing derivatives of maleic resin in an organic solvent such as toluene has been used for gravure ink, particularly for a paper gravure ink. However, almost no suitable resin has been found except rosin or its derivatives in spite of the fact that a variety of synthetic resins have been developed heretofore.

The basic properties required for the resin used for a paper gravure ink are as follows:

(1) High softening point and fast drying speed,
(2) Relatively low molecular weight, and suitable solution viscosity when dissolved in an organic solvent such as toluene,
(3) Good colorant dispersibility,
(4) Good viscosity stability suitable for the preparation of a paper gravure ink, and
(5) Fine gloss and uniformly printed matter in case of printing, that is to say, good printability.

Generally, a petroleum resin has a comparatively low molecular weight, and recently it has been possible to produce such a petroleum resin having a high softening point ranging from 130° C. to 140° C. Thus, many attempts to use the resin for gravure ink have been made. The gravure ink prepared by dissolving the resin alone or in combination with limed rosin in toluene and kneading with some colorants, however, has not given a good gloss and uniformly printed surface. Further, the poor viscosity of the ink and the rapid rising of the ink viscosity on standing or segregation of colorants during standing have made it impossible to use the resin for gravure ink.

Since the so-called maleic modified resin obtained from adding maleic anhydride to a petroleum resin has a higher softening point than the unmodified petroleum resin, and carries polar groups, many attempts to utilize it for gravure ink have been made heretofore. As a result, it has been found that such a resin may be used only together with specified colorant, for example, Carmine 6B, but only in combination with limed rosin which has been employed today. Accordingly, it is impossible to make use of such a resin alone or in combination with any other colorants as a resinous component for gravure ink because of the poor printing effect and low viscosity stability.

It has also been attempted to use Ca salt of a maleic modified petroleum resin, which has been prepared on the same idea as that of the process for producing limed rosin, as a resinous ingredient for gravure ink. In this case, however, the Ca salt forming reaction is quite difficult, and only a small amount of Ca is added thereto even at a high temperature as the maleic modified petroleum resin may be deteriorated. Thus, the present situation of the art is that only the same effect as that of the maleic modified petroleum resin has been attained.

As mentioned above in detail, it is clear that the resin for manufacturing of gravure ink at the present time is only rosin containing derivatives, and that the maleic modified petroleum resin is only used partially as a mere auxiliary component.

Rosin is a natural product and fluctuates both in the price and quality. Further, production has been on the decrease in recent years. Accordingly, the inventors have made an earnest effort to find a synthetic method for producing a resin capable of being substituted for the rosin containing derivatives used in the gravure ink manufacturing, and finally succeeded in inventing a process for preparing a novel modified petroleum resin used for gravure ink. It will be described in detail hereinafter.

This invention relates mainly to a process for preparing a modified petroleum resin having a high softening point. More particularly, it relates to a process for preparing a novel modified petroleum resin for use in gravure ink which is characterized in that the process comprises polymerizing a fraction boiling in the range of from 140° C. to 220° C. obtained from cracked distillates of petroleum thermal cracking to produce a petroleum resin having such a remarkably high softening point as above 160° C., adding a predetermined quantity of an unsaturated carboxylic acid or its anhydride to the said petroleum resin, and further esterifying the acid added petroleum resin thus formed with alcohols to obtain a petroleum resin having a softening point above 145° C.

That is to say, this invention is concerned with a process for producing a petroleum resin for use in gravure ink which is characterized in that a fraction having any boiling point between 140° C. and 220° C. obtained from distillates of petroleum thermal cracking is polymerized in the presence of a Friedel-Crafts type catalyst to obtain a petroleum resin with a softening point above 160° C., and the polymerized resin thus obtained is mixed with from 0.01 to 0.4 mol of an unsaturated carboxylic acid or its anhydride per 100 g. of the polymerized resin, and subsequently the acid added petroleum resin thus formed is esterified with from 0.2 to 2.0 mols of a monohydric alcohol per mol of the unsaturated acid or anhydride thereof employed to obtain a resin having a softening point above 145° C.

It is an object of this invention to provide a process for producing a modified petroleum resin suitable for the preparation of gravure ink from a fraction distilled from thermally cracked petroleum distillates. It is another object of the invention to provide a novel modified petroleum resin which is capable of being used for gravure ink in place of rosin containing derivatives. These and other objects will become apparent to those skilled in the art from the following description and claims.

The suitable raw material oil used in this invention is a fraction having the boiling range of from 140° C. to 220° C. among the distillates obtained from thermal cracking of petroleum, and is such a fraction that the unsaturated compounds contained in it consist essentially of styrene, its alkyl derivatives, indene, and its alkyl derivatives.

A petroleum resin having a softening point above 160° C., which is one of the essentials of this invention, is usually prepared by polymerizing the raw material oil as described above. Especially, it is more preferable to use a prepared raw material oil as a feed which contains more than 20 percent by weight of indene and its derivatives, and which has an indene content ratio more than 30 percent defined by the following formula:

Indene content ratio (percent)

$$= \frac{\text{total content of indene and its derivatives in raw material oil (percent by weight)}}{\text{polymerizable components in raw material oil (percent by weight)}} \quad (1)$$

where every component in the raw material oil is determined by gas chromatography, for example, under the following condition:

(i) Styrene, allylbenzene, 1,3,5-trimethylbenzene, and o-ethyltoluene are analyzed in a column of 3 meters in length packed with Celite (Johns Manville Corp.) containing 20 percent by weight of Apiezon L grease (Associated Electrical Industries Ltd.), and the flow rate of the carrier helium is 60 cc. per min. at 100° C.

(ii) The other components except those shown in (i) are analyzed in a column of 3 meters in length packed with Celite containing 20 percent by weight of polyethylene glycol 4,000, and the flow rate of the carrier helium is 60 cc. per min. at 125° C.

In this invention, the term "polymerizable component" signifies the total amount of styrene, its alkyl derivatives, indene, its alkyl derivatives, cyclopentadiene, and methylcyclopentadiene in the raw material, which are determined by the gas chromatography as is mentioned above.

Such a raw material oil may be prepared by subjecting cracked distillates boiling in the range of from 140° C. to 220° C. to fractionation or extractive distillation, etc.

The raw material oil thus prepared is polymerized at a temperature in the range of from −30° C. to +60° C. for a period within 10 min. to 15 hrs. using from 0.01 percent to 5 percent by weight of a Friedel-Crafts type catalyst such as boron trifluoride, aluminum chloride, boron trifluoride phenol complex, preferably, boron trifluoride, boron trifluoride etherate, boron trifluoride phenolate, based on the raw material being polymerized. After the completion of the polymerization, the catalyst remaining is decomposed for removal with an alkali such as sodium hydroxide or sodium carbonate, and the reaction product is washed with water, if necessary, and further subjected to distillation or evaporation to separate the unreacted oil and lower molecular polymer. Thus, an aromatic hydrocarbon resin having a high softening point above 160° C. and having, for example, a bromine value below 40 can be obtained.

According to this invention, an unsaturated carboxylic acid or its anhydride is added to the petroleum resin having a softening point above 160° C. thus formed. In this case, however, the unsaturated carboxylic acid or its anhydride is added in the range from 0.01 to 0.4 mol per 100 g. of the petroleum resin, and the addition reaction is performed, for instance, at a temperature in the range of from 140° C. to 250° C., without a catalyst or with a free radical initiator such as an organic peroxide, for a period within the range from 30 min. to 15 hrs.

The unsaturated carboxylic acid or its anhydride used in this invention is, for example, acrylic acid, methacrylic acid, maleic acid, maleic anhydride, tetrahydrophthalic acid, tetrahydrophthalic anhydride, fumaric acid, citraconic acid, itaconic acid, etc.

If the amount of the unsaturated carboxylic acid or its anhydride added to 100 g. of the petroleum resin used is below 0.01 mol, the acid added petroleum resin cannot be used for the preparation of gravure ink because of its poor colorant dispersibility resulting from an inadequate amount of polar groups. In contrast with this, if above 0.4 mol per 100 g. of the petroleum resin is employed, the acid addition reaction becomes difficult, and moreover, the acid added petroleum resin cannot also be utilized for gravure ink because the solution viscosity of the gravure ink varnish prepared by dissolving the acid added petroleum resin after esterification, which will be described later, in toluene, becomes extremely high. On the contrary, in order to control the solution viscosity so as to be suitable for gravure ink varnish, the concentration of the resin is forced to be lowered to the utmost. As a result, it brings about the disadvantage that the gloss of gravure ink formed is reduced, and that uniformly printed matter cannot be obtained.

In this invention, the addition reaction of an amount of the unsaturated carboxylic acid or its anhydride within the range as prescribed above to the petroleum resin with a softening point above 160° C. can be carried out at the reaction rate of about 100 percent, if the reaction is performed under the conditions as mentioned above. Consequently, there is no need to remove the unreacted matter after the reaction. The trace unreacted matter remaining, however, may be eliminated by blowing in a heated inert gas, if necessary. The petroleum resin thus obtained will be called the "acid modified petroleum resin" hereafter.

According to this invention, the acid modified petroleum resin described above is further esterified with a monohydric alcohol. The amount of the alcohol used is from 0.2 to 2.0 mols, preferably from 0.25 to 1.0 mol, per mol of the unsaturated carboxylic acid or its anhydride employed in producing the acid modified petroleum resin. In the esterification reaction, the acid modified petroleum resin, which is heat melted or dissolved in a hydrocarbon solvent such as benzene, toluene, or xylene etc., is reacted with a monohydric alcohol, for example, at a temperature between 180° C. and 250° C. for a period within the range of from 20 min. to 10 hrs.

The monohydric alcohol useful in this invention may be any lower alcohol such as methyl alcohol, ethyl alcohol, n-propyl alcohol, etc., and may be any higher alcohol such as nonyl alcohol, decyl alcohol, and lauryl alcohol, etc. A mixture of more than two kinds of these alcohols may be employed.

In the reaction according to this invention, an atmospheric or pressure reactor with a heating and stirring apparatus is used. An apparatus for eliminating of water forming during the reaction may be fitted on the reactor, if necessary. In case of the esterification of the acid modified petroleum resin added with a dibasic carboxylic anhydride, the reaction proceeds easily, because there is no formation of water. Therefore, it is unnecessary to equip the reactor with a water removing device. When the esterification is performed with a solvent, the solvent must be removed by distillation after the completion of the reaction. However, provided that toluene is used as a solvent, the reaction product may be available for gravure ink varnish without any further processing only by means of adding additionally toluene thereto in order to adjust the viscosity of the reaction product solution without removing the solvent after the reaction.

If the amount of the monohydric alcohol is below 0.2 mol per mol of the unsaturated carboxylic acid or its anhydride utilized in the acid modification, the acid modified petroleum resin remains unchanged, and the gravure ink produced from it has an inferior printability and lower viscosity stability. If it is above 2 mols, that is to say, if a polybasic carboxylic acid or its anhydride higher than a dibasic carboxylic acid is used in the acid modification, more than one mol of the monohydric alcohol may be employed. In this case, however, the esterification reaction becomes not only difficult but proceeds excessively. Hence, the softening point of the esterified resin is lowered below 145° C., and the drying speed of the gravure ink prepared therefrom is slowed remarkably. In this invention, it is preferable to use an amount of from 0.25 to 1.0 mol of monohydric alcohol.

When a polyhydric alcohol is used in place of a monohydric alcohol, polyesterification reaction occurs between more than two molecules of the acid modified petroleum resin and the polyhydric alcohol to form a high molecular compound, or the esterified product becomes insoluble in organic solvents, depending upon the reaction conditions. Therefore, it is undesirable to use a polyhydric alcohol, because the esterified resin comes to form a high viscous solution when used for gravure ink or because it cannot be made into varnish.

The modified petroleum resin prepared in the manner as described above has such a high softening point as above 145° C., and is the most suitable resin for gravure ink.

As the esterification of the acid modified petroleum resin with a monohydric alcohol makes the softening point of the esterified resin lower, the softening point of the resin obtained by modifying a conventional petroleum resin by the same process as that of this invention is extremely low. Further, there occurs various disadvantages that the drying speed of the gravure ink prepared from it becomes slow to the utmost, and that blocking results. Therefore, it cannot be used as a resin for producing gravure ink.

This invention is characterized in that the esterification of the acid modified petroleum resin and raising the softening point of the esterified resin product to above 145° C. are attained satisfactorily at the same time. And, in this point, this invention has its novelty.

The characteristic features of this invention are summarized as follows:

(1) The resin obtained according to this invention can independently be used for variously colored gravure inks as a novel resin for producing gravure ink, and is equal or far better in printing effect, in printability, and in viscosity stability, compared with the conventional rosin containing resin for gravure ink, (2) As the resin obtained according to this invention can be made into gravure ink by the same process and recipe as those preparing the same from the conventional rosin containing resin, it is unnecessary to install new equipment in order to prepare gravure ink. That is to say, gravure ink is obtained by combining the varnish, which is prepared so that the concentration of the resin, obtained in this invention, in an aromatic hydrocarbon solvent such as toluene may be from 35 percent to 55 percent and the solution viscosity, about 40 cps. (centipoise) at 40° C., with organic colorants and thereafter, by kneading in a sand mill, (3) The resin obtained according to this invention may be used in combination with the conventional rosin containing resin, if necessary, (4) The resin according to this invention is of pale color, and therefore, it has a high color tone reproducibility and good color developing ability, (5) The resin obtained according to this invention is made by means of a relatively easy process, and accordingly, at a comparatively lower cost, and (6) The resin obtained according to this invention is stable both in quality and price owing to being a synthetic resin product, and no unstable factor can be found as from a natural resin product (uniformity).

The following examples will serve to illustrate this invention more fully and practically. It should not be construed, however, that these examples restrict this invention, in so far as they are within the spirit and scope of this invention.

EXAMPLE 1

A cracked distillate having the boiling range of from 140° C. to 220° C., which was obtained as a by-product in naphtha stream cracking, was distilled to separate a fraction having a boiling range of from 178° C. to 220° C. by utilizing a fractionator with 30 plates. The polymerizable components of the fraction was 70 percent by weight in content, a total content of indene and methylindene, 35 percent by weight, and the indene content ratio, 50 percent.

By using the fraction as a raw material oil, the polymerization reaction was carried out at a temperature of 30° C. with 0.6 percent by weight of boron trifluoride ethyl ether complex as a catalyst for 3 hrs. After the completion of the reaction, the catalyst was removed with an aqueous sodium hydroxide solution, and the reaction product was washed with water, and distilled to obtain the resin (I) by eliminating the unreacted oil and lower polymer. The resin (I) was in a yield of 53 percent by weight to the raw material oil, its softening point, 175° C., and its bromine value, 28.

To the resin (I) was added 6 g. (0.061 mol) of maleic anhydride per 100 g. of the resin (I), and the reaction was performed in a reaction vessel with a stirrer at a temperature of 210° C., while heat melting and stirring, for 5 hrs. to obtain the acid modified petroleum resin (I-A). Further, 1 mol of n-butanol per mol of maleic anhydride used was added, and the esterification was carried out in a closed reaction vessel at a temperature of 210° C. for 5 hrs. to obtain the modified petroleum resin (I-E). The softening point of the resin (I-E) thus obtained was 156° C., and the acid value, 20. The rate of the esterification reaction determined by an infrared absorption spectrography was 98 percent. By dissolving the modified petroleum resin (I-E) in toluene, a toluene solution having a viscosity of 40 cps. at 25° was prepared. The resin concentration in the solution was 42 percent by weight.

To the varnish thus prepared was added colorants such as Carmine 6B, Phthalocyanine Blue, chrome yellow along with Benzine Yellow, and a toluene solution of gilsonite along with carbon black to make respectively a red, a blue, a yellow, and a black printing ink. After one week, their viscosity was determined, and it was found that their viscosity rising remained within 10 percent, as compared with their viscosity immediately after preparation, and that their viscosity stability was good. Printing was effected by using these inks, and it was found that the drying speed was almost in the same degree, as compared with that of the conventional gravure ink using limed resin, and that the gloss and uniformity of the printed surface were better.

EXAMPLE 2

To the acid modified petroleum resin (I-A) obtained in Example 1 was added 0.5 mol of lauryl alcohol per mol of the maleic anhydride added, and the esterification was carried out at a temperature of 210° C. for 2 hrs. to obtain the modified resin (II-E). The resin (II-E) thus obtained had a softening point of 165° C., an acid value of 28, and the reaction rate was 99 percent.

Gravure ink was prepared from the resin (II-E) in the same manner as described in Example 1, and the viscosity stability was determined. Thus, it was found that the viscosity stability was as good as that of the gravure ink obtained in Example 1, and that the drying speed in printing was faster than that of the gravure ink prepared from limed rosin. Moreover, it was also proved that the printability was very superior, and that the gravure ink was good enough to be employed as a process ink for double printing.

EXAMPLE 3

The cracked distillate having the boiling range of from 140° C. to 220° C, used in Example 1 was distilled to separate a fraction having the boiling range of from 173° C. to 220° C., using a fractionator with 30 plates. The fraction thus obtained had 65 percent by weight of the polymerizable component, a total content of 28 percent by weight of indene and methylindene, and 43 percent of the indene content ratio. To the fraction thus separated was added 0.7 percent by weight of boron trifluoride phenol complex, based on the fraction, and the polymerization reaction was conducted at a temperature of 10° C. for 5 hrs. After the completion of the reaction, the reaction mixture was processed in the same manner as described in Example 1 to obtain the resin (III). The resin (III) thus obtained was in a yield of 51 percent by weight, had a softening point of 163° C. and a bromine value of 25.

To the resin (III) was added 0.2 mol of tetrahydrophthalic anhydride per 100 g. of the resin (III), and the addition reaction was carried out under the same conditions as described in Example 1. After the completion of the reaction, 0.3 mol of n-decyl alcohol per mol of the added tetrahydrophthalic anhydride was added, and the esterification was performed in the same apparatus and under the same conditions as described in Example 1. The modified petroleum resin (III–E) thus obtained had a softening point of 168° C. and an acid value of 53.

Printing inks having various colors were prepared in the same way as described in Example 1 using the resin (III–E). As a result, it was found that their viscosity stability, drying speed and printability were all excellent, and that they had the required properties to be employed as a paper gravure ink.

Comparative Example 1

Printing inks with different colors were prepared in the same manner as described in Example 1 utilizing the unmodified petroleum resin (I) obtained in Example 1. However, all of the printing inks thus prepared proved to be unavailable as gravure ink owing to the separation and precipitation of colorants after two days.

Comparative Example 2

Printing inks with a variety of colors were made in the same way as described in Example 1 using the acid modified petroleum resin, (I–A) obtained in Example 1. After standing for one week, the inks, except the red and the blue printing ink, underwent a remarkable viscosity rise of more than ten times the original viscosity. Printing was performed using the red, and the blue printing ink. The gloss, however, was worse than in the case of limed rosin being used, and the printing surface was uneven.

Comparative Example 3

A commercially available petroleum resin having a softening point of 123° C. was modified under the same conditions as described in Example 2, and a modified petroleum resin having a softening point of 100° C. and an acid value of 29 was obtained. Printing inks were prepared in the same manner as described in Example 1 from the modified petroleum resin thus obtained. The viscosity stability was good, but the drying speed was quite slow. Therefore, they proved to be of no practical use.

Comparative Example 4

To the acid modified petroleum resin obtained in Example 3 was added an equimolar amount of ethylene glycol to the mols of the acid anhydride added, and the esterification was conducted at a temperature of 210° C. for 3 hrs. The esterified petroleum resin thus formed was partially insoluble in toluene. Hence, it was unavoidable to reduce the resin concentration in toluene to as low as 28 percent by weight in order to prepare a toluene solution of the resin having a viscosity of 40 cps. at 25° C., even if by using the soluble part alone. In printing with the printing ink thus prepared, no gloss was found thereof, and it was of no practical use, accordingly.

What is claimed is:

1. A process for preparing a modified petroleum resin for use in gravure ink which comprises polymerizing a thermally cracked petroleum fraction having a boiling point in the range of from 140° C. to 220° C. in the presence of a Friedel-Crafts type catalyst to obtain a resin having a softening point above 160° C., reacting said resin with an unsaturated carboxylic acid or anhydride thereof in the range of from 0.01 mol to 0.4 mol per 100 g. of said resin, at a temperature in the range of 140° C. to 250° C., in the presence or absence of a free radical initiator, and esterifying the acid modified petroleum resin thus obtained with an amount of a monohydric alcohol from 0.2 mol of 2 mols per mol of the unsaturated carboxylic acid or anhydride thereof used to produce a resin having a softening point above 145° C.

2. A process as claimed in claim 1, wherein said Friedel-Crafts type catalyst is a member selected from the group consisting of boron trifluoride, aluminum chloride, boron trifluoride phenol complex and boron trifluoride ether complex.

3. A process as claimed in claim 1, wherein said unsaturated carboxylic acid or anhydride thereof is a member selected from the group consisting of acrylic acid, methacrylic acid, maleic acid, maleic anhydride, tetrahydrophthalic acid, tetrahydrophthalic anhydride, fumaric acid, citraconic acid, itaconic acid and mixtures thereof.

4. A process as claimed in claim 1, wherein said monohydric alcohol is a member selected from the group consisting of methyl alcohol, ethyl alcohol, n-propyl alcohol, nonyl alcohol, decyl alcohol, lauryl alcohol and mixtures thereof.

5. A process as claimed in claim 1, wherein said fraction to be polymerized contains more than 20 percent by weight of indene and its derivatives, and has an indene content ratio more than 30 percent.

6. A process according to claim 1, wherein the amount of monohydric alcohol is from 0.25 to 1.0 mole per mole of the unsaturated carboxylic acid or anhydride thereof used.

7. A process according to claim 1, wherein the unsaturated carboxylic acid or anhydride is maleic anhydride and the monohydric alcohol is n-butanol.

8. A process according to claim 1, wherein the unsaturated carboxylic acid or anhydride is maleic anhydride and the monohydric alcohol is lauryl alcohol.

9. A process according to claim 1, wherein the unsaturated carboxylic acid or anhydride is tetrahydrophthalic anhydride and the monohydric alcohol is n-decyl alcohol.

10. The modified petroleum resin suitable for use in gravure ink produced by the process of claim 1.

References Cited

UNITED STATES PATENTS

| | | | |
|---|---|---|---|
| 3,532,672 | 10/1970 | Takahara | 260—82 |
| 3,468,837 | 9/1969 | Wheeler et al. | 260—82 |
| 2,993,880 | 7/1961 | Aldridge et al. | 260—78.4 D |
| 2,634,256 | 4/1953 | Sparks et al. | 260—78.4 D |
| 2,824,859 | 2/1958 | Fasce | 260—78.4 D |
| 3,161,620 | 12/1964 | Perkins et al. | 260—78.4 D |
| 3,574,792 | 4/1971 | Hayashi | 260—82 |

HARRY WONG, JR., Primary Examiner

U.S. Cl. X.R.

106—30; 260—33.6 UA, 41 C, 81, 82, 875